United States Patent
Fritz

(10) Patent No.: US 12,480,265 B2
(45) Date of Patent: *Nov. 25, 2025

(54) METHOD FOR MILLING OFF TRAFFIC AREAS WITH A MILLING DRUM, AS WELL AS MILLING MACHINE FOR CARRYING OUT THE METHOD FOR MILLING OFF TRAFFIC AREAS

(71) Applicant: Wirtgen GmbH, Windhagen (DE)

(72) Inventor: Matthias Fritz, Hennef (DE)

(73) Assignee: Wirtgen GmbH, Windhagen (DE)

( * ) Notice: Subject to any disclaimer, the term of this patent is extended or adjusted under 35 U.S.C. 154(b) by 124 days.

This patent is subject to a terminal disclaimer.

(21) Appl. No.: 18/489,122

(22) Filed: Oct. 18, 2023

(65) Prior Publication Data

US 2024/0102255 A1    Mar. 28, 2024

Related U.S. Application Data

(63) Continuation of application No. 17/957,067, filed on Sep. 30, 2022, now Pat. No. 11,795,633, which is a
(Continued)

(30) Foreign Application Priority Data

Dec. 19, 2019   (DE) .................... 10 2019 135 225.8

(51) Int. Cl.
*E01C 23/088*   (2006.01)
*E01C 19/00*    (2006.01)

(52) U.S. Cl.
CPC .......... *E01C 23/088* (2013.01); *E01C 19/004* (2013.01)

(58) Field of Classification Search
CPC ..... E01C 23/088; E01C 23/127; E01C 19/004
See application file for complete search history.

(56) References Cited

U.S. PATENT DOCUMENTS

| 4,807,131 A | 2/1989 | Clegg |
| 5,612,864 A | 3/1997 | Henderson |

(Continued)

FOREIGN PATENT DOCUMENTS

| CN | 102322015 A | 1/2012 |
| CN | 105316995 A | 2/2016 |

(Continued)

OTHER PUBLICATIONS

China Office Action for corresponding patent No. 2022032101906480, dated Mar. 24, 2022, 5 pages.
(Continued)

*Primary Examiner* — Janine M Kreck
(74) *Attorney, Agent, or Firm* — Lucian Beavers; Patterson Intellectual Property Law, PC

(57) ABSTRACT

In the method for milling off traffic areas with a milling drum of a milling machine, the following steps are provided:
  obtaining and storing target profile data (x, y, $Ft_{(x,y)}$) of a desired target profile (8) of a surface of the traffic area (3) in target condition, wherein target values ($Ft_{(x,y)}$) for a locally desired milling depth (Ft), which are specified relative to the surface of the traffic area (2) to be worked, are assigned to position data (x, y) in an in particular stationary coordinate system independent of the milling machine (6),
  determining the current x, y position of the milling drum (4) in the coordinate system and detecting the milling depth (Ft') of the milling drum (4) currently adjusted relative to the surface of the traffic area (2, 3),
  during the milling operation, controlling the milling depth (Ft) of the milling drum (4) as a function of the target value ($Ft_{(x,y)}$) for the locally desired milling depth (Ft) assigned to the current x, y position of the milling drum (4) and the currently detected milling depth (Ft'),
(Continued)

updating the target profile data (x, y, $Ft_{(x,y)}$) in the current position (x, y) of the milling drum (4) on the worked traffic area (3) by the currently actually milled milling depth (Ft), and storing the updated target profile data (x, y, $Ft_{(x,y)}$).

16 Claims, 12 Drawing Sheets

Related U.S. Application Data continuation of application No. 17/117,433, filed on Dec. 10, 2020, now Pat. No. 11,459,712.

(56) References Cited

U.S. PATENT DOCUMENTS

| | | | |
|---|---|---|---|
| 6,047,227 | A | 4/2000 | Henderson et al. |
| 6,371,566 | B1 | 4/2002 | Haehn |
| 6,954,999 | B1 | 10/2005 | Richardson et al. |
| 6,966,387 | B2 | 11/2005 | Marriott, Jr. et al. |
| 7,144,191 | B2 | 12/2006 | Kieranen et al. |
| 7,643,923 | B2 | 1/2010 | Buehlmann et al. |
| 8,794,867 | B2 | 8/2014 | Snoeck et al. |
| 8,961,065 | B2 | 2/2015 | Snoeck et al. |
| 8,989,968 | B2 | 3/2015 | Fritz et al. |
| 9,039,320 | B2 | 5/2015 | Snoeck et al. |
| 9,359,729 | B2 * | 6/2016 | Fritz .................. G05D 1/0214 |
| 10,370,803 | B2 | 8/2019 | Berning et al. |
| 10,494,778 | B2 | 12/2019 | Menzenbach et al. |
| 11,113,668 | B2 | 9/2021 | Paulsen et al. |
| 11,459,712 | B2 * | 10/2022 | Fritz .................. E01C 19/004 |
| 11,795,633 | B2 * | 10/2023 | Fritz .................. E01C 19/004 |
| 2002/0089446 | A1 | 7/2002 | Diggelen et al. |
| 2006/0173600 | A1 | 8/2006 | Dietsch et al. |
| 2006/0174239 | A1 | 8/2006 | Dietsch et al. |
| 2006/0198700 | A1 | 9/2006 | Maier et al. |
| 2007/0214687 | A1 | 9/2007 | Woon et al. |
| 2007/0286023 | A1 | 12/2007 | Bull et al. |
| 2008/0152428 | A1 | 6/2008 | Berning et al. |
| 2009/0108663 | A1 | 4/2009 | Berning et al. |
| 2009/0292412 | A1 | 11/2009 | Han et al. |
| 2014/0097665 | A1 | 4/2014 | Paulsen et al. |
| 2014/0314481 | A1 | 10/2014 | Snoeck et al. |

FOREIGN PATENT DOCUMENTS

| | | |
|---|---|---|
| CN | 107083735 A | 8/2017 |
| DE | 102011106139 A1 | 12/2012 |
| DE | 102012100934 A1 | 8/2013 |
| EP | 964958 A1 | 12/1999 |
| EP | 1118713 A1 | 7/2001 |
| EP | 2716816 A1 | 4/2014 |
| WO | 9516228 A1 | 6/1995 |

OTHER PUBLICATIONS

European Search Report and Search Opinion for corresponding patent application No. EP 20214868.0, dated May 17, 2021, 5 pages.

* cited by examiner

METHOD FOR MILLING OFF TRAFFIC AREAS WITH A MILLING DRUM, AS WELL AS MILLING MACHINE FOR CARRYING OUT THE METHOD FOR MILLING OFF TRAFFIC AREAS

BACKGROUND OF THE INVENTION

1. Field of the Invention

The present invention relates to a method for milling off traffic areas with a milling drum, as well as to a milling machine for carrying out the method for milling off traffic areas.

2. Description of the Prior Art

Such milling machines are required, inter alia, to remove the old road pavement of a traffic area in a first step for the purpose of producing a new road pavement.

In road milling operations, different systems are used for the purpose of automatically controlling the milling depth of the milling drum. A common feature of some systems is that a constant target value for the milling depth is specified once and said value is maintained until a new target value is specified manually. Said target value is therefore independent of the position of the milling machine in the plane so that it is not possible to level out any unevennesses in specific sections of the traffic area. Milling off an existing traffic area with a constantly adjusted milling depth results in the unevennesses being reproduced on the new surface.

In the process, the actual milling depth (actual value) is measured in various ways via a sensor and compared to the desired milling depth (target value) by a milling depth controller. Said comparison takes place continuously and the detected deviation from the target value is converted, in the milling depth controller, into a control signal for height adjustment of the milling drum.

SUMMARY OF THE DISCLOSURE

It is the object of the present invention to create a method and a device for milling off a traffic area which, in a simple manner, enables the repeated milling of an already either completely or partially milled traffic area with one or a plurality of milling machines.

The above object is achieved, according to the present invention, by the features of the claims.

According to one method disclosed herein, the following steps are provided:

obtaining and storing target profile data x, y, Ft (x, y) of a desired target profile of a surface of the traffic area to be worked after the work has been effected, wherein target values Ft (x, y) for the locally desired milling depth Ft, which are specified relative to the surface of the traffic area to be worked, are assigned to position data x, y in an in particular stationary coordinate system independent of the milling machine, determining the current x, y position of the milling drum in the coordinate system and detecting the milling depth Ft' of the milling drum currently adjusted relative to the surface of the traffic area, during the milling operation, controlling the milling depth Ft of the milling drum as a function of the target value Ft (x, y) for the locally desired milling depth Ft assigned to the current x, y position of the milling drum and the currently detected milling depth Ft', updating the target profile data x, y, Ft (x, y) in the current position x, y of the milling drum on the worked traffic area by the currently actually milled milling depth amount to an updated target value, and storing the updated target profile data x, y, Ft (x, y).

The current calculation during the milling operation may therefore take into account, based on the position data obtained, whether a milling amount is still outstanding in the specified position or whether the target value has already been achieved. Updating and storing the target profile data in connection with a current position ultimately enables an already milled partial area of the traffic area to be worked or travelled over, respectively, one more time by the same or a different milling machine which is in possession of the same updated target profile data. It is thus also possible to work an area which has already been partially milled.

Detecting the milling depth means measuring the currently adjusted milling depth or applying an adjustment value for the milling depth of the milling drum from the machine control system.

It is understood that control of the milling depth may also include closed-loop control.

The updated actual profile data are preferably stored in real time.

As an alternative, the following steps may be provided:

obtaining and storing actual profile data x, y, z of an actual profile of the surface of the traffic area to be worked and target profile data x, y, z' of a desired target profile of the surface of the traffic area after the work has been effected, wherein measured actual profile values z (x, y) or specified locally desired target profile values z' (x, y), respectively, are assigned to position data x, y in an in particular stationary coordinate system independent of the milling machine, determining the current x, y position of the milling drum in the coordinate system and detecting the milling depth Ft' currently adjusted relative to the surface of the traffic area, controlling the milling depth Ft of the milling drum as a function of the difference between the actual profile value z (x, y) and the target profile value z' (x, y) assigned to the current x, y position of the milling drum, and the currently detected milling depth Ft', updating the actual profile data x, y, z in the current position x, y of the milling drum on the worked traffic area by the currently actually milled milling depth Ft, and storing the updated actual profile data x, y, z.

Consequently, according to the second alternative, it is provided that actual profile data are also obtained and stored in addition to the target profile data. During open-loop control or closed-loop control, respectively, of the milling depth, the difference between the actual and target profile values is calculated and the milling depth is controlled taking into account the currently adjusted milling depth.

In the process, the actual profile data are updated by the actually milled milling amount. It is understood that the target profile data may alternatively be updated instead of the actual profile data. The updated actual profile data are preferably stored in real time.

The following steps may be provided in each of the alternatives:

recording the actual profile and generating actual profile data x, y, z of the traffic area to be worked in an in particular stationary coordinate system independent of the milling machine, and generating and storing the target profile by means of calculating target profile data x, y, Ft (x, y) on the basis of the actual profile data x, y, z and the locally desired milling depth relative to the surface of the traffic area, or by means of calculating target profile data x, y, z' (x, y) in the independent coordinate system on the basis of the actual profile data x, y, z obtained and the locally desired milling depth.

In this arrangement, it may be provided that, when recording the actual profile, the traffic area is divided into fields for the purpose of generating the actual profile data, wherein an x, y position is assigned to each field or, preferably, to each node of the virtual boundary lines between the fields.

When generating the target profile for the target profile data, the traffic area to be produced may also be divided into fields, wherein an x, y position is assigned to each field or each node of the virtual boundary lines between the fields in the common coordinate system.

In all alternatives, it may be provided that, at the lateral ends with the positions xL, yL; xR, yR of the milling drum, the milling depth is controlled separately with regard to the respective current x, y position.

In a further development, it may be provided that the updated target or actual profile data x, y, Ft (x, y); x, y, z, respectively, are stored taking into account the milling width Fb and the three-dimensional alignment of the milling drum, wherein
the respective updated target profile value Ft (xL, yL); Ft (xR, yR) or actual profile value z (xL, yL); z (xR, yR), respectively, is assigned to each x, y position of the milling drum on the worked-off traffic area at the lateral ends with the positions xL, yL; xR, yR of the milling drum.

In this arrangement, interpolated updated target profile values Ft (xn, yn) or actual profile values z (xn, yn), respectively, may preferably be assigned to the positions xn, yn of the milling drum between the lateral ends with the positions xL, yL; xR, yR.

These may be positions, for example, along the lowest contact line of the milling drum.

It is preferably provided that the traffic area is divided into triangular or rectangular fields, the different or identical edge length of which is in the range between 1 mm and 50 cm, preferably between 5 mm and 20 cm.

In this arrangement, the updated interpolated target profile values Ft (xn, yn) or actual profile values z (xn, yn), respectively, are assigned to the nodes passed over by the milling drum between the ends with the positions xL, yL; xR, yR.

In a particularly preferred embodiment, an absolute coordinate system is used for the x, y positions of the actual profile data and target profile data.

In a milling machine for milling off traffic areas, comprising
a machine frame,
comprising a height-adjustable milling drum,
a machine control system for controlling the milling depth, comprising a computer and a storage device,
a position determination device, which feeds position data x, y for the current position of the milling drum in an in particular stationary coordinate system independent of the milling machine to the machine control system,
a milling depth measuring device, which feeds the currently adjusted milling depth Ft' of the milling drum to the machine control system,
it is provided that:
the machine control system obtains specified target profile data x, y, Ft (x, y) of a surface of the traffic area to be worked in target condition, and stores those target profile data x, y, Ft (x, y) in the storage device for which target values Ft (x, y) for the locally desired milling depth specified relative to the surface are assigned to the position data x, y,
the computer of the machine control system controls the milling depth of the milling drum as a function of the current position data x, y of the milling drum, the currently detected milling depth Ft' and the target value Ft (x, y) assigned to the position of the milling drum, wherein
the computer of the machine control system updates the target profile values Ft (x, y) of the target profile data x, y, Ft (x, y) in the respective current position of the milling drum on the worked traffic area by the currently actually milled milling depth, and stores the updated target profile data x, y, Ft (x, y) in the storage device.

In an alternative milling machine for milling off traffic areas, comprising
a machine frame,
comprising a height-adjustable milling drum,
a machine control system for controlling the milling depth, comprising a computer and a storage device,
a position determination device, which feeds position data x, y for the current position of the milling drum in an in particular stationary coordinate system independent of the milling machine to the machine control system,
a milling depth measuring device, which feeds the currently detected milling depth Ft' of the milling drum to the machine control system,
it is provided that:
the machine control system obtains, and stores in the storage device, specified actual profile data x, y, z of the surface of the traffic area to be worked and target profile data x, y, z' of the desired surface in target condition of the worked traffic area,
the computer of the machine control system controls the milling depth of the milling drum as a function of the current position data x, y of the milling drum, the currently detected milling depth Ft' and the difference between the target and actual profile values z' (x, y); z (x, y), wherein
the computer of the machine control system updates the actual profile values z of the actual profile data in the respective current position x, y of the milling drum on the milled traffic area by the currently actually milled milling depth and stores the updated actual profile data x, y, z in the storage device.

The detected milling depth may be the milling depth currently adjusted in the machine control system or a currently measured milling depth.

The updated profile data may be stored in real time.

In both alternatives, it may be provided that the computer of the machine control system controls the milling depth at the lateral ends with the positions xL, yL; xR, yR of the milling drum separately with regard to the respective positions xL, yL and xR, yR.

The machine control system may preferably store the updated target or actual profile data x, y, Ft (x, y); x, y, z, respectively, in the storage device taking into account the milling width Fb and the three-dimensional alignment of the milling drum, wherein the computer of the machine control system assigns the respective updated target value Ft (xL, yL); Ft (xR, yR) or actual profile value z (xL, yL); z (xR, yR), respectively, to each position of the milling drum on the milled traffic area at the face ends xL, yL; xR, yR of the milling drum.

In this arrangement, the machine control system may also assign interpolated updated target profile values Ft (xn, yn) or actual profile values z (xn, yn), respectively, to positions xn, yn along the milling drum between the lateral ends with the positions xL, yL; xR, yR.

BRIEF DESCRIPTION OF THE DRAWINGS

Hereinafter, embodiments of the invention are illustrated in more detail with reference to the drawings.

The following is shown.

DETAILED DESCRIPTION

Figure 1:
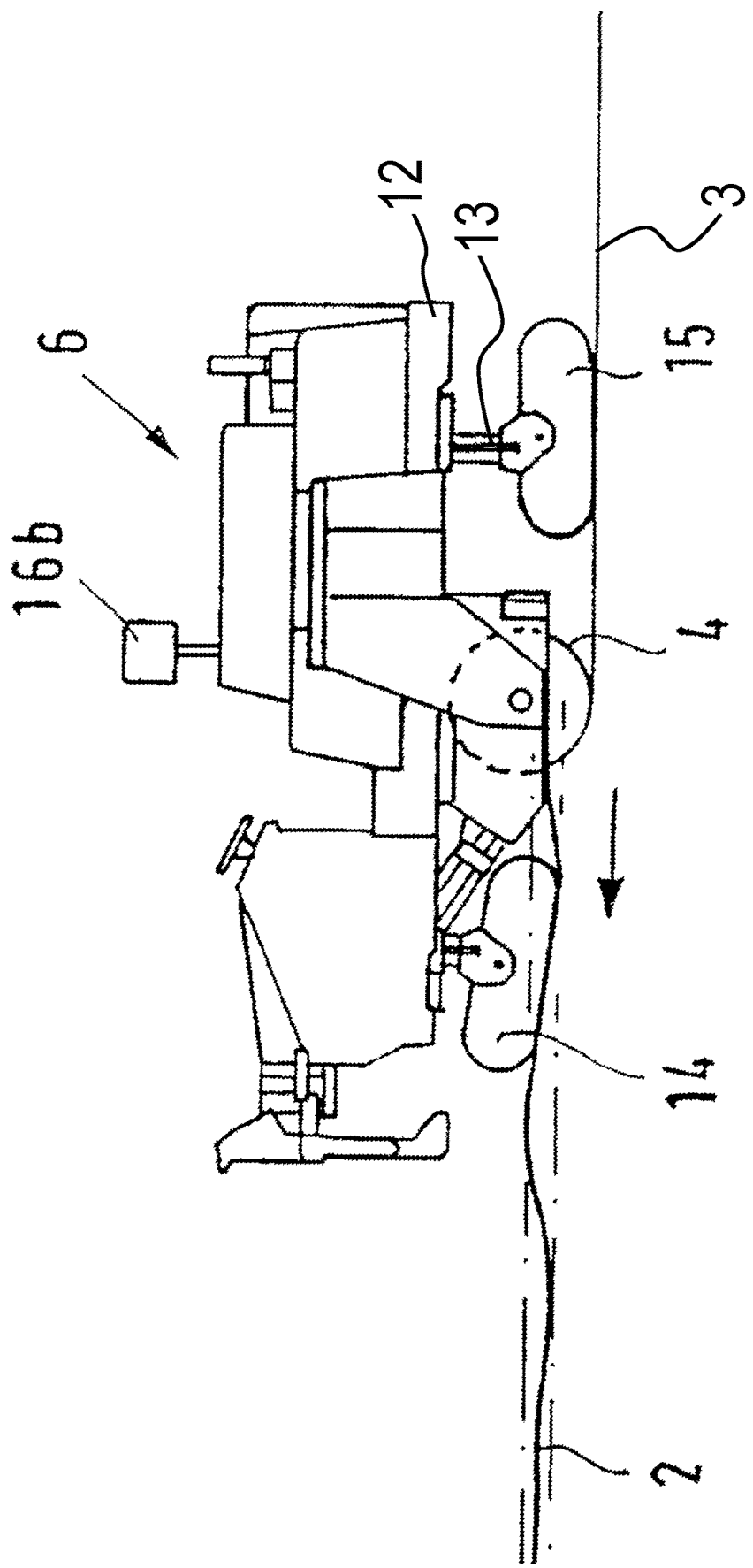
FIG. 1 a milling machine (without transport conveyor) for carrying out the method for milling off a surface of traffic areas, FIGS. 2 and 3 the sequences of the methods according to the present invention, FIG. 4 a schematic illustration of the periphery of the machine control system of the milling machine according to the present invention, FIG. 5 schematically a desired target profile of a surface, FIG. 6 the actual profile of the surface of the traffic area, FIG. 7 the superimposition of the actual profile with the target profile, FIG. 8 a partially worked traffic area, FIG. 9 a section along the line A-A in FIG. 7, FIG. 10 a section along the line B-B in FIG. 7, FIG. 11 an enlarged illustration in top view of detail X in FIG. 7, and FIG. 12 detail X in a perspective illustration of the actual profile of the non-worked traffic area and of the even target profile of the lower-level worked traffic area.

FIG. 1 shows, schematically, a milling machine 6 (without front-end transport device), the front tracked ground-engaging unit 14 of which rests on the as yet non-worked traffic area 2, while the rear tracked ground-engaging unit 15 already rests on the milling track of the worked-off traffic area 3. The lifting columns 13 of both tracked ground-engaging units 14, 15 may be adjusted for the purpose of adjusting the milling depth of the milling drum 4. It is more complex, however, to provide for height adjustment of the milling drum 4 itself.

Figure 2:
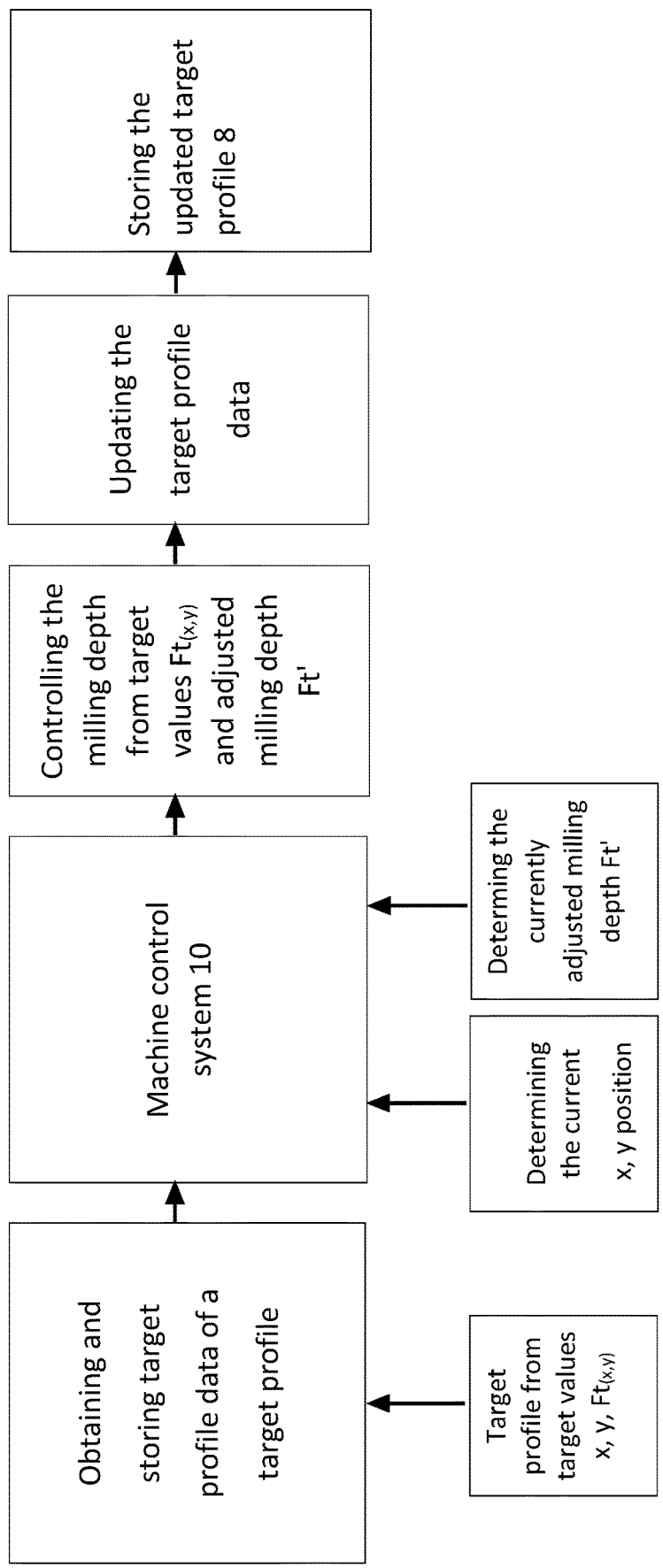
Figure 3:
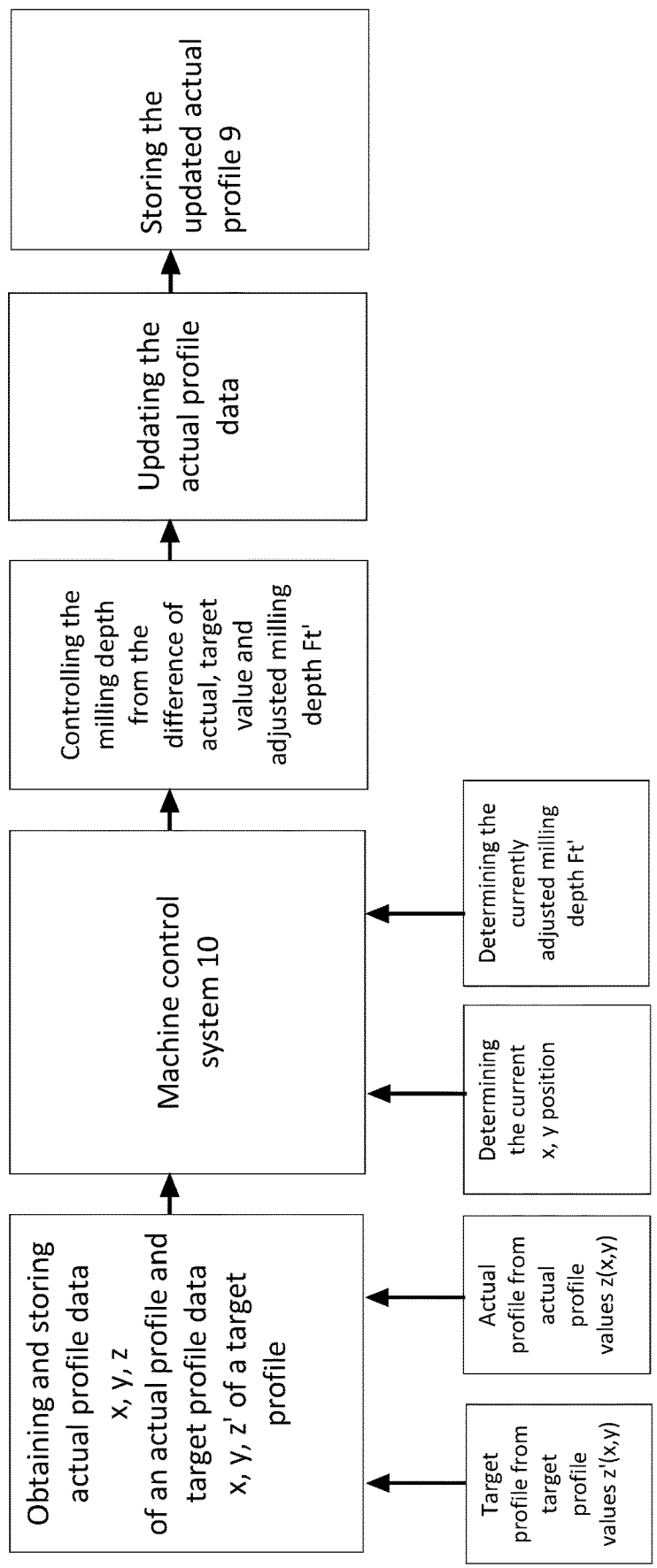
Figure 4:
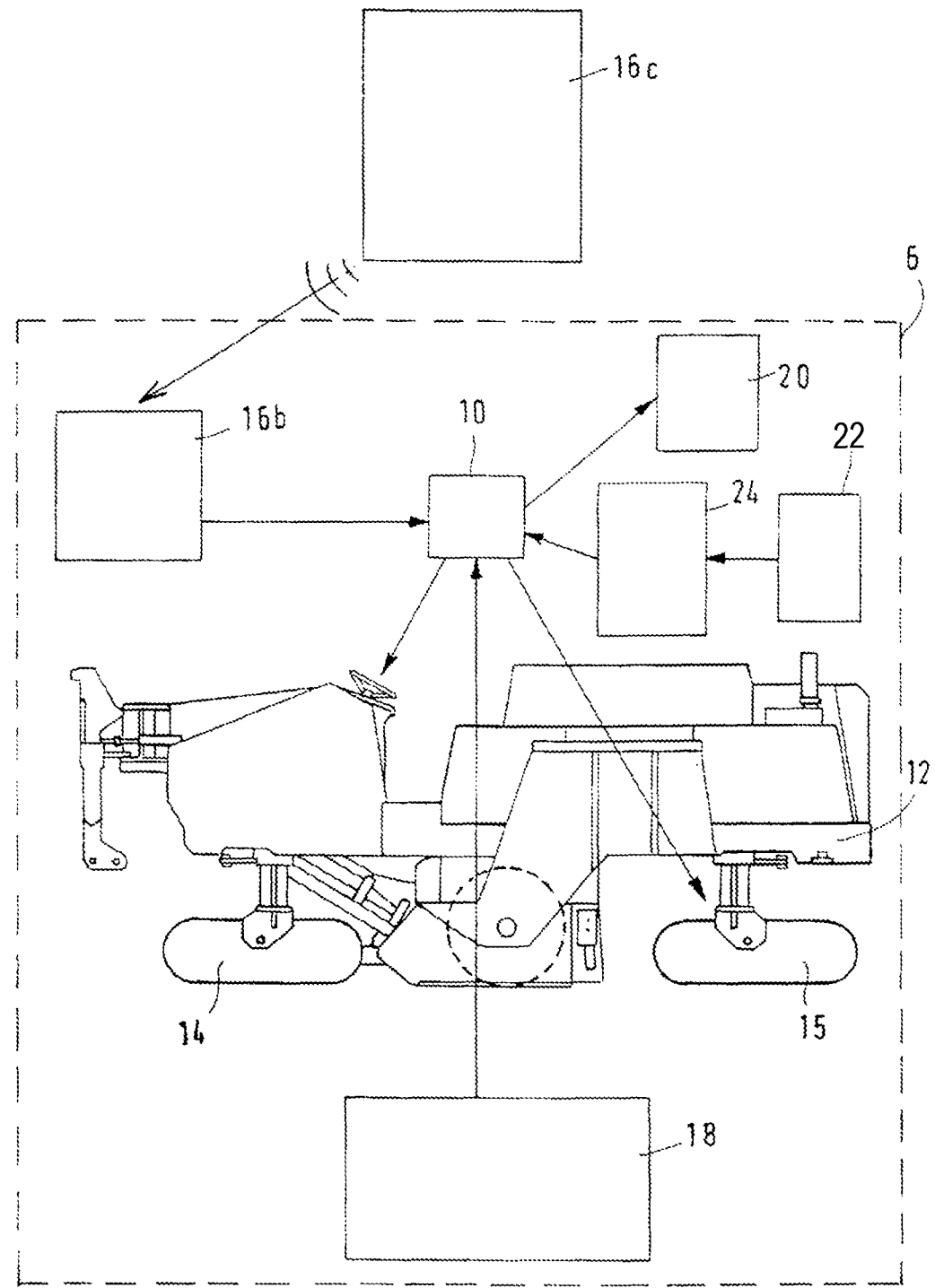

The alternative methods for milling off traffic areas 2 are explained in more detail in FIGS. 2 and 3.

The traffic area 2 to be worked is detected in its x, y coordinates, wherein a milling depth value Ft (x, y) is assigned to each position x, y, whereby target profile data x, y, Ft (x, y) are generated, which may be fed to and stored in the machine control system 10.

The milling process now consists in determining, in a first step, the current x, y position of the milling drum 4 at least with regard to the path coordinates. This is effected, for example, by means of a position determination device 16, the mobile part 16b of which is arranged on the machine frame 12 of the milling machine 6.

Position determination for the position of the milling drum 4 may be effected, for example, via the methods described in the following:

a) In the case of absolute position determination, the machine coordinates are measured in absolute terms in all three space coordinates (x, y, z). This may be effected, for example, using a supported GNS system or using laser tracking stations with automatic target tracking (total stations).

With the GNS system, position determination is effected by means of satellites, wherein the travel time differences of signals between differently positioned satellites and the object are used for position determination. Higher accuracies are achieved by means of the DGNS system (differential GNSS), where, in addition to the GNSS receiver 16b moved with the milling machine 6, a stationary GNSS receiver 16c is set up in the vicinity. Calculating the difference between the signals of both GNSS receivers enables a higher accuracy to be obtained. For the purpose of achieving still higher accuracies, the position information may additionally be corrected via gyro compass, distance pulse and steering information (supported DGNS system).

b) When using one or a plurality of automatic total stations, the machine is equipped with a reflector, namely, an active or passive prism, which reflects a laser beam emitted by a transmitting/receiving unit back to the same. The position of the machine may be calculated from the travel time and/or the phase position of the signal and the receiving angles.

The actual position of the milling drum 4 may be determined in absolute values in x, y and z coordinates from the difference in the data of the stationary GNS system 16c and the mobile GNS system 16b. The measured values of the position determination device 16b, 16c are fed to the machine control system 10, where they may be displayed by means of a monitor or a display device 20, respectively. The position determination device 16 may also be referred to as a position sensor 16 configured to generate at least one position signal corresponding to the current x, y position of the milling drum. The current milling depth may be measured via a milling depth measuring device 18 and transmitted to the machine control system 10. The milling depth measuring device 18 may also be referred to as a milling depth sensor 18 configured to generate at least one milling depth signal corresponding to the current milling depth of the milling drum.

As shown in FIG. 2, the target profile data are transmitted, for example, to a computer 22, which may store the obtained target profile and updated target profile in a storage device 24 of the machine control system 10.

In this arrangement, it may alternatively also be provided for the target profile data to be transmitted wirelessly to the machine control system 10.

A display device 20 connected to the machine control system 10 may be provided for displaying data or the progress of work, for example, the condition of the traffic area 2 or of the worked-off traffic area 3, respectively.

Figure 5:
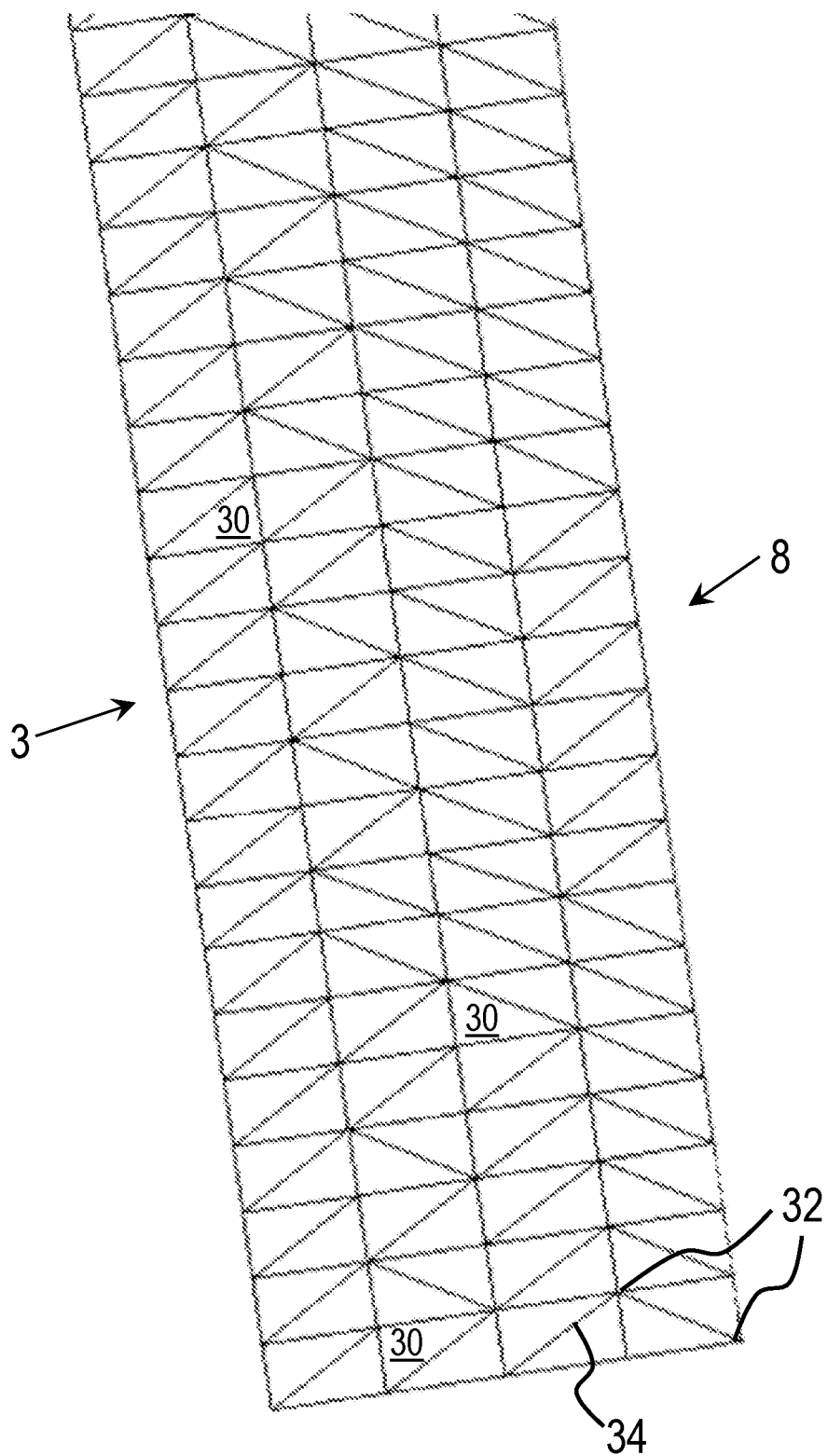

FIG. 5 depicts, schematically, a desired target profile x, y, z" of a surface of the worked traffic area 3, in which a desired milling depth Ft specified relative to the surface of the traffic area 2 is attributed to the respective position data x, y in an in particular stationary coordinate system independent of the milling machine 6.

The coordinate system has an arbitrary, yet constant directional orientation relative to the course of the traffic area 2 to be worked, and is therefore in particular not necessarily parallel to the boundaries of the traffic area 2.

The target profile 8, which is formed from target profile data, is preferably calculated in advance for a traffic area 2 to be worked, and is fed to the machine control system 10 prior to the start-up of the milling machine 6, wherein the target profile data of the desired target profile may be stored in a storage device 24.

The target profile 8 may be divided into fields 30, which may be, for example, rectangular, square or preferably triangular in shape. The fields 30 are limited by virtual boundary lines 34, wherein, alternatively, position data x, y are assigned to the fields 30, or, preferably, the coordinates of the position x, y are assigned to the nodes 32 formed by the virtual boundary lines 34.

Figure 6:
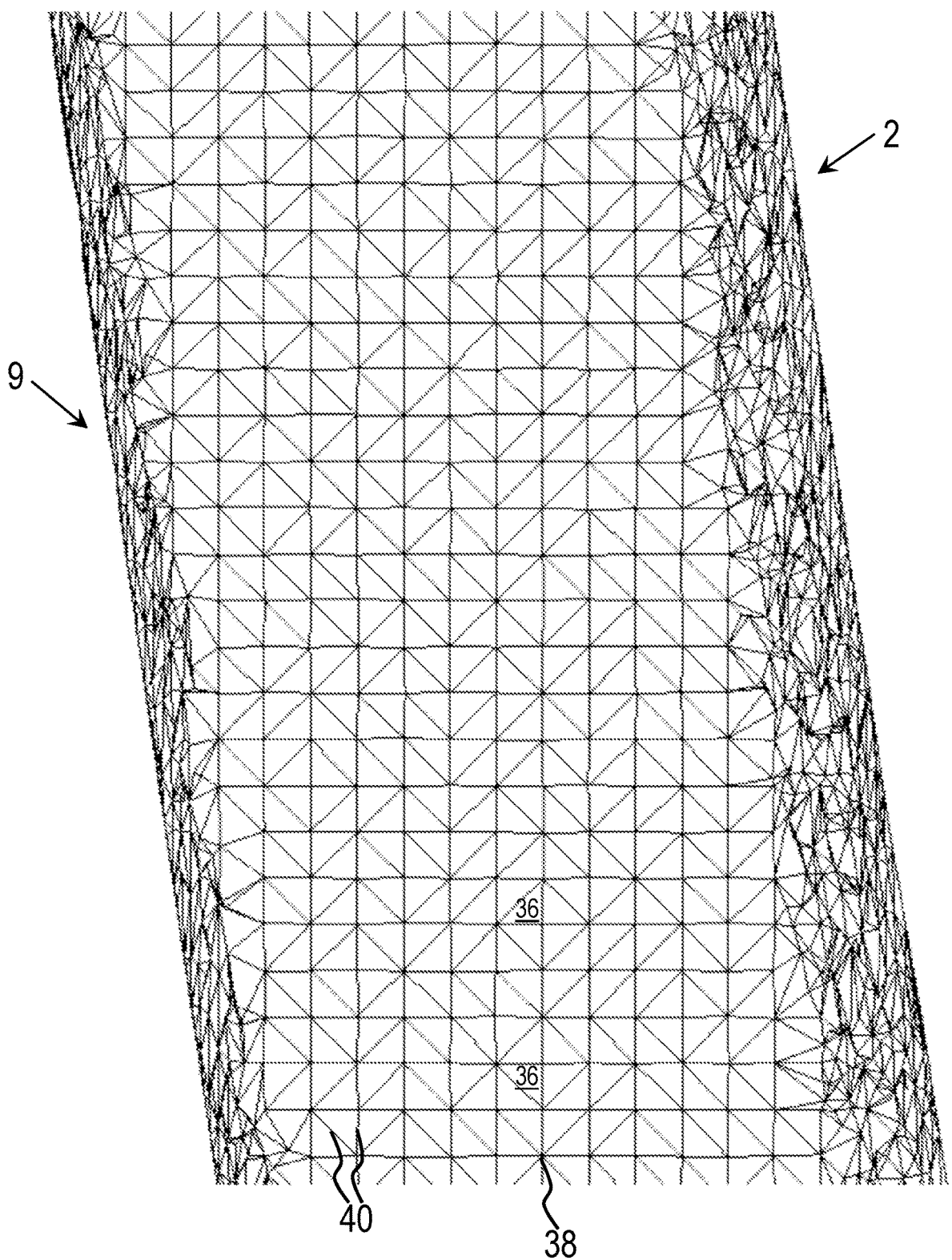

FIG. 6 shows the actual profile 9, in which the surface of the traffic area 2 is divided into fields 36 in a similar fashion to the target profile 8. Said fields 36 may, for example, also be square, rectangular or preferably triangular in shape, as can be inferred from FIG. 6. Coordinates x, y of the coordinate system independent of the milling machine 6 are assigned to the nodes 38.

Said nodes 38 are formed by the virtual boundary lines 40 of the fields 36.

Figure 7:
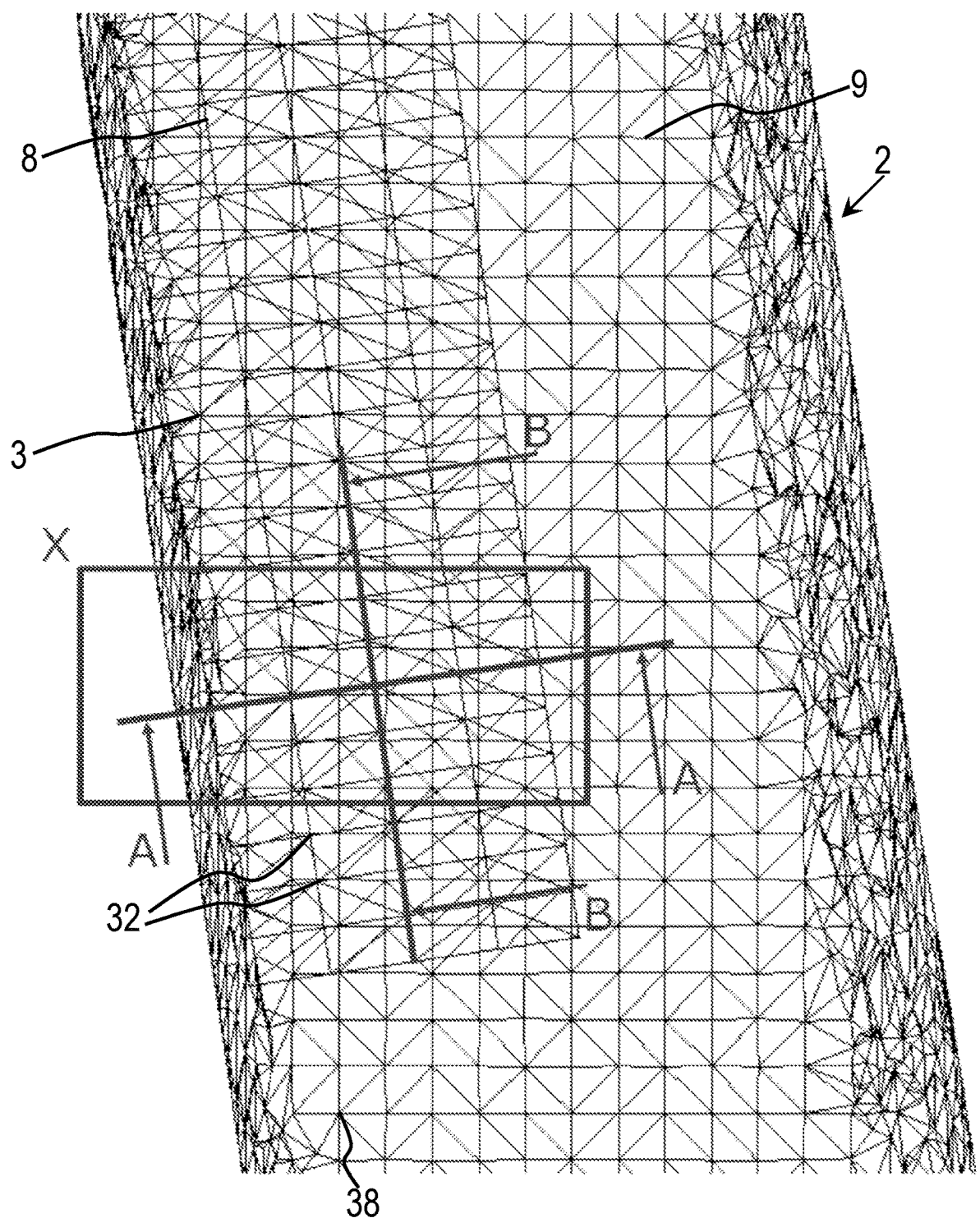

FIG. 7 shows the superimposition of the actual profile 9 of the traffic area 2 to be worked with the target profile 8, depicted in dashed lines, for said traffic area 2, as it can be inferred from FIG. 5. The depicted target profile 8 comprises, for example, two milling tracks extending next to one another, which exhibit, for example, a milling width of two adjacent rectangles of four fields 30.

FIG. 7 shows an only partial superimposition of the target profile 8 with the actual profile 9 of the non-worked traffic area 2. When working the traffic area 2, it is understood that the entire traffic area 2 may ultimately be superimposed with a target profile 8 if the entire traffic area 2 and not just a part is to be worked.

Figure 8:
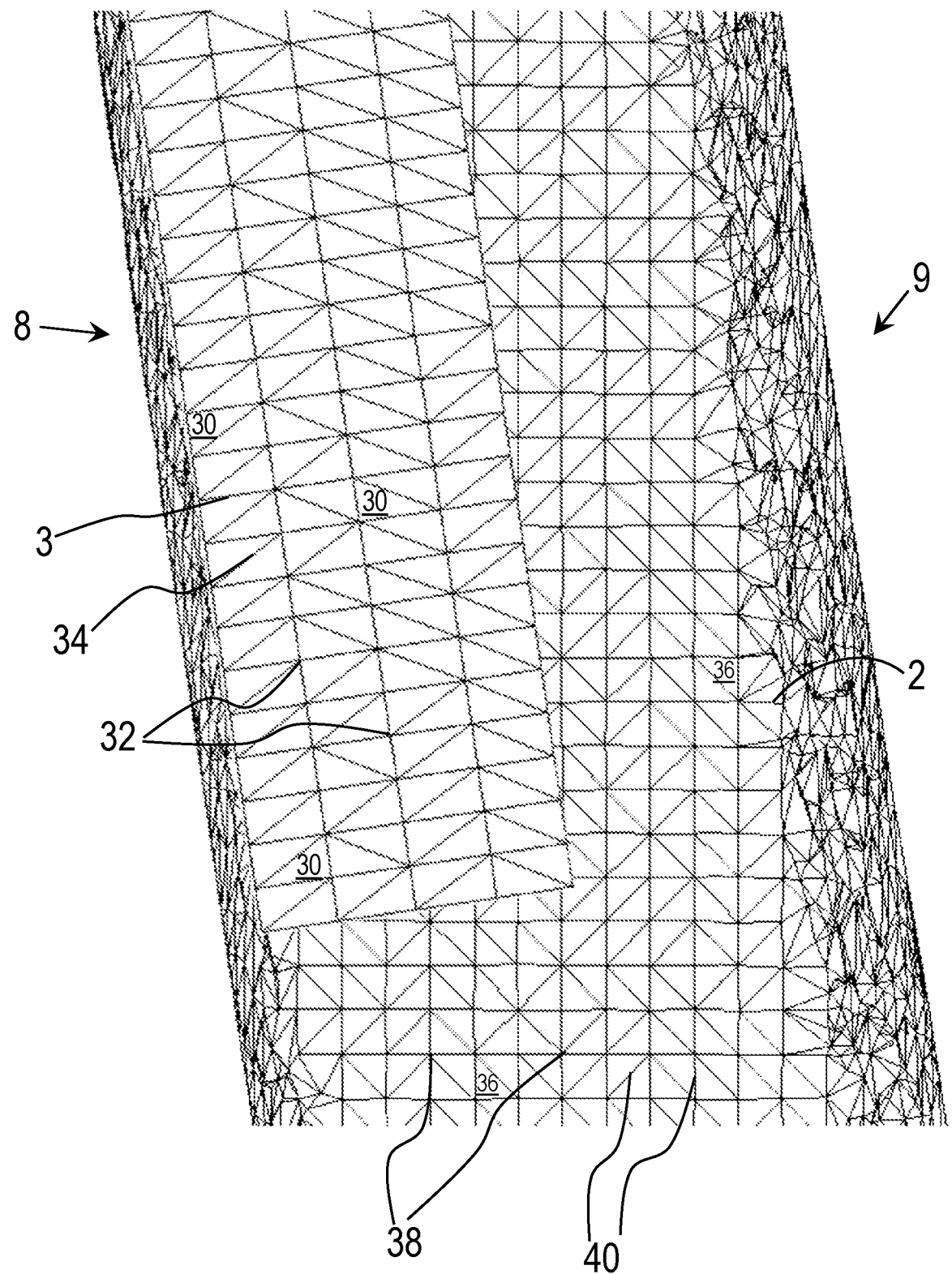

In FIG. 8, the current profile 9 is not superimposed in the section of the already milled traffic area 3, so that only the target profile 8 is visible, which is intended to correspond to the surface of the worked traffic area 3.

As can be inferred from FIGS. 7 and 8, the alignment, shape and size of the fields 30 of the target profile 8 does not have to match the alignment, shape and size of the fields 36 of the actual profile 9. It is only essential that the positions of the nodes 32, 38 refer to the same stationary, preferably absolute coordinate system.

For the purpose of milling off a surface of the traffic area 2 to be worked, the milling machine 6 may be moved arbitrarily on the traffic area 2 and on an already milled traffic area 3.

For each current position x, y of the milling drum 4, the machine control system 10 reads the related target value Ft (x, y) for the locally desired milling depth Ft from the storage device 24 containing the target profile and controls the current milling depth Ft of the milling drum 4 accordingly, taking into account the milling depth Ft' currently adjusted relative to the surface of the traffic area 2. In the process, the target profile data x, y, Ft (x, y) for the currently already milled traffic area 3 are simultaneously updated and stored.

Updating prevents an already milled traffic area 3 being milled again when the milling drum 4 travels over the same position again.

In a preferred embodiment, when travelling over a traffic area 2, 3, the positions xL, yL; xR, yR of the face ends of the milling drum 4 are detected, in each of which the milling depth Ft is controlled separately. If the locally desired milling depth Ft has already been achieved at one end of the milling drum 4 and a correspondingly updated target value Ft (x, y) is available, the milling depth Ft' currently adjusted in this position also changes to the surface of the traffic area 3, so that the machine control system 10 does not have to correct the milling depth when passing from an already milled traffic area 3 to a still-to-be-worked traffic area 2 and vice versa.

The positions xL, yL; xR, yR of the face ends of the milling drum 4 are determined according to the lowest position of the cutting circle of the milling drum 4.

The machine control system 10 may calculate the direction of travel of the milling machine in the coordinate system from the change in the x, y position values and the travelling speed from the change in the x, y position values over time.

If nodes 32 of the target profile 8 are travelled over during milling, the target profile data x, y, Ft (x, y) are updated.

Updating of the target profile data may be effected, for example, in that the computer checks as to whether the line of the lowest position of the cutting circle between the face ends of the milling drum 4 travels over nodes 32. If this is the case, an updated milling depth value updated by the currently milled milling depth amount is assigned to the coordinates of the node 32 and stored in the storage device 24 to update the target profile data.

Nodes 32 located between the face ends of the milling drum 4 may be updated by means of interpolation.

In the alternative procedure, the actual profile is additionally stored in the storage device 24 of the machine control system 10. The computer 22 of the machine control system 10 controls the milling depth Ft of the milling drum 4 as a function of the current position data x, y of the milling drum 4, the currently detected milling depth Ft' and the difference between the target and actual profile values z' (x, y); z (x, y). The computer 22 of the machine control system 10 updates the actual profile values z of the actual profile data in the respective current position x, y of the milling drum 4 on the milled traffic area 3 by the currently actually milled milling depth Ft and stores the updated actual profile data x, y, z in the storage device 24.

The updated actual profile data are preferably stored in real time. It is understood that the target profile data may alternatively be updated instead of the actual profile data.

Figure 9:
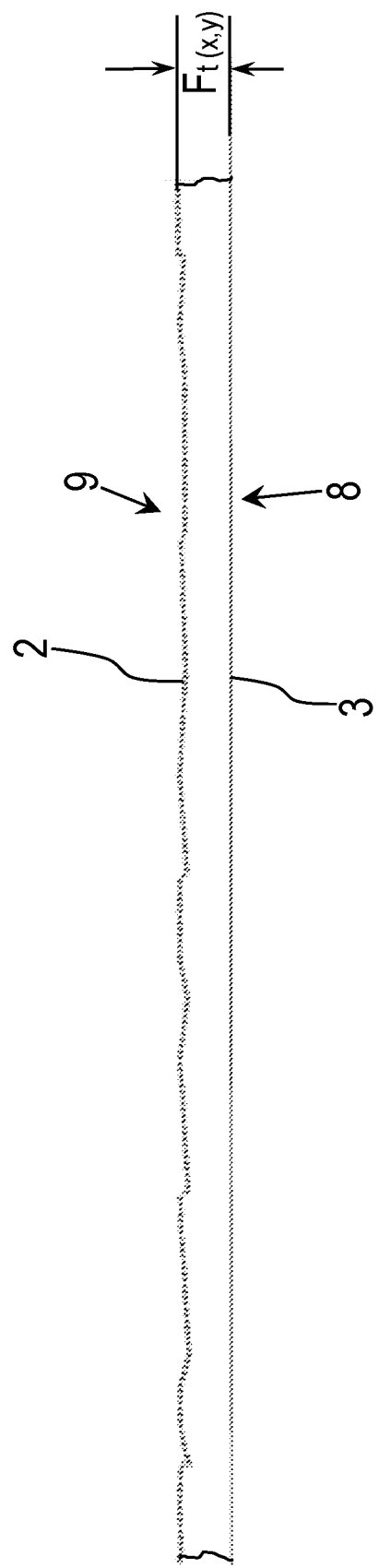

FIG. 9 shows a cross section through the traffic areas 2, 3 in the direction of line A-A in FIG. 7 prior to the working process. It can be inferred that the actual profile 9 exhibits an uneven traffic area 2, wherein the unevennesses in FIG. 9 are depicted in an exaggerated fashion for clarification. The lower-level target profile 8 shows the desired even traffic area 3 after the completion of all milling processes. The actual profile 9 has a position-dependent distance from the target profile 8, which corresponds to the milling depth Ft. The cross section according to FIG. 9 extends essentially transverse to the longitudinal direction of the traffic areas 2,3 and represents, for example, wheel ruts in the pavement.

Figure 10:
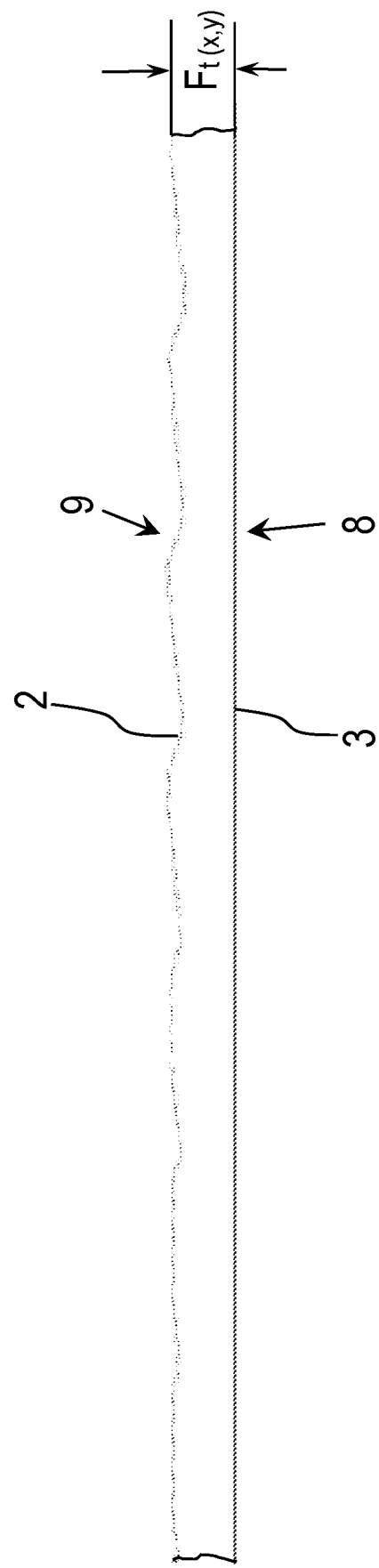

FIG. 10 shows a cross section through the traffic areas 2, 3 in the direction of line B-B in FIG. 7 prior to the working process. The line B-B extends orthogonal to the line A-A in the direction of travel of the milling machine. In this context, the actual profile 9 shows the unevennesses existing in the direction of travel, for example, longitudinal waviness of the traffic area 2.

Figure 11:
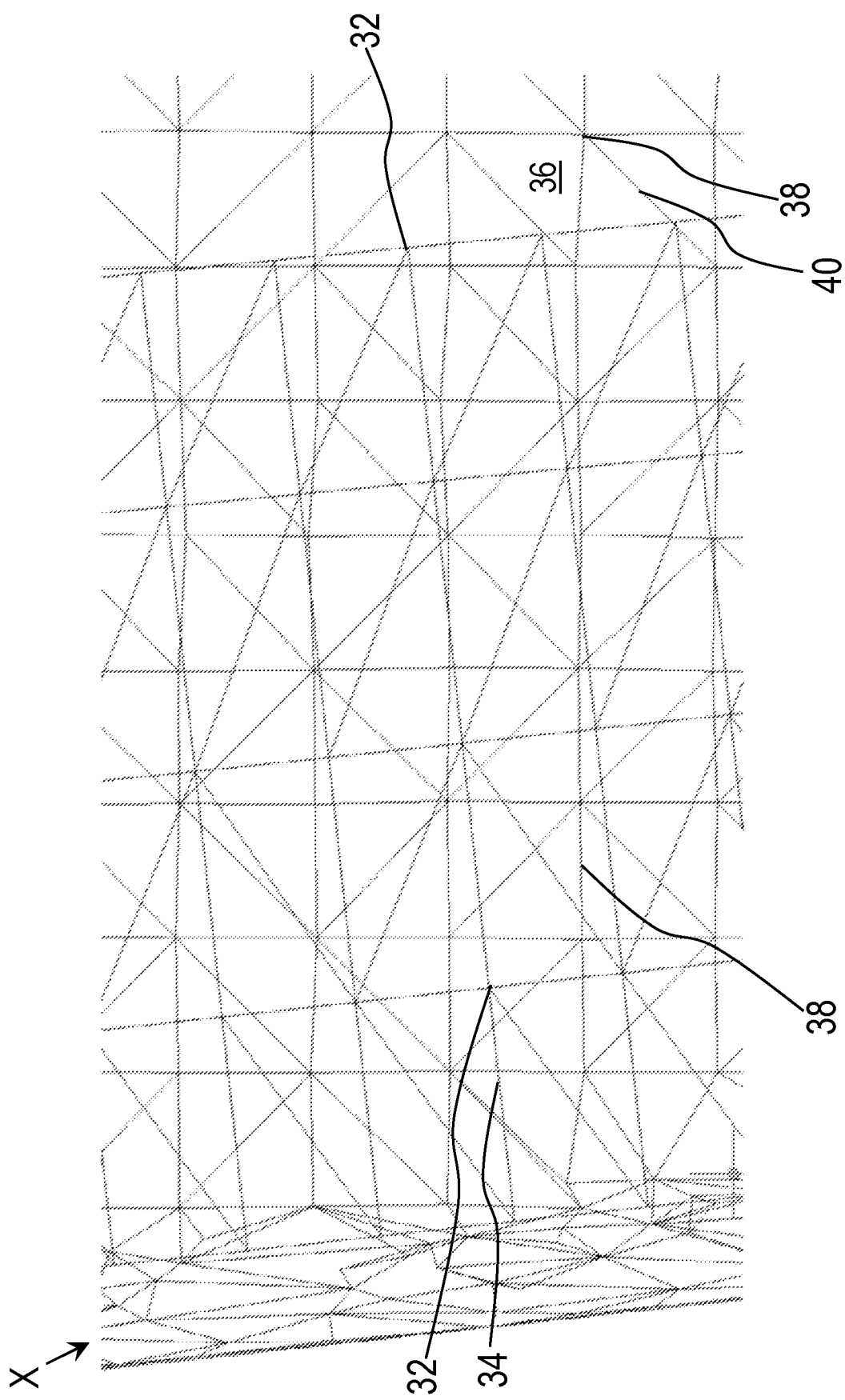

FIG. 11 is an enlarged illustration of the detail X in FIG. 7 in top view, in which the actual profile 9 is superimposed with the lower-level target profile 8.

Figure 12:
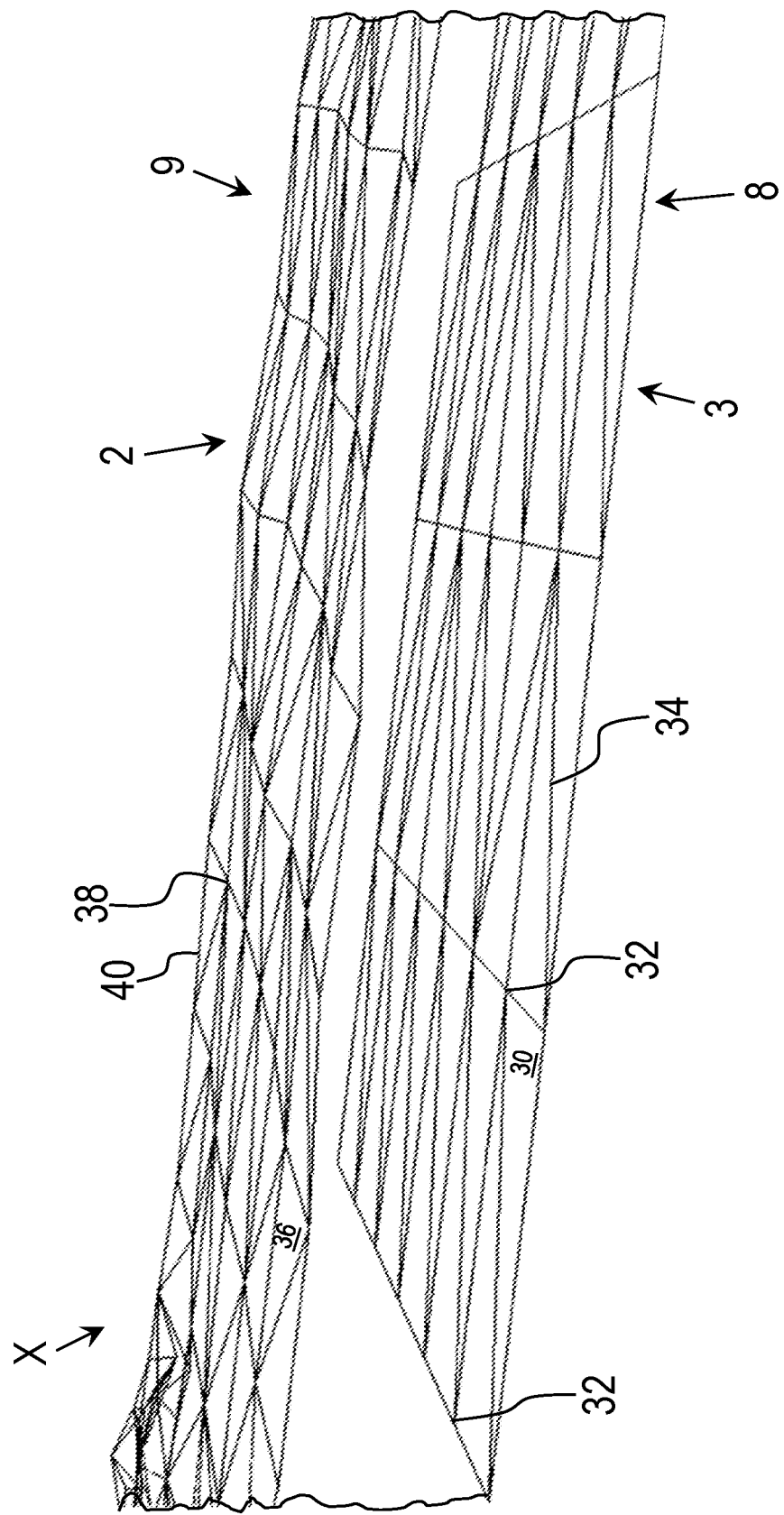

FIG. 12 shows, schematically, a perspective view of the actual profile 9 of the non-worked traffic area 2 with its exaggerated unevennesses according to the detail X in FIG. 7 and, below the traffic area 2, the even target profile of the worked traffic area 3.

The invention claimed is:

1. A milling machine for milling off a traffic area, comprising:

a machine frame;

a height adjustable milling drum supported from the machine frame;

a position sensor configured to detect a current x, y position of the milling drum in a stationary coordinate system independent of the milling machine and to generate at least one position signal corresponding to the current x, y position of the milling drum in the stationary coordinate system independent of the milling machine;

a milling depth sensor configured to detect a currently adjusted milling depth (Ft') of the milling drum, and to generate at least one milling depth signal corresponding to the currently adjusted milling depth (Ft') of the milling drum; and a controller configured to:
  obtain and store target profile data (x, y, $Ft_{x,y}$) of a desired target profile of a surface of the traffic area in target condition, wherein target values ($Ft_{x,y}$) for a locally desired milling depth are assigned to position data (x,y) in the stationary coordinate system independent of the milling machine;
  receive the at least one position signal and the at least one milling depth signal;
  during a milling operation, determine the current x,y position of the milling drum in the coordinate system based at least in part on the at least one position signal, and determine the current milling depth of the milling drum based at least in part on the at least one milling depth signal;
  update the target profile data corresponding to the current x,y position of the milling drum by the current milling depth of the milling drum, the updated target profile data including an updated target value for the locally desired milling depth; and
  store the updated target profile data.

2. The milling machine of claim 1, wherein:
the controller is further configured to control the milling depth of the milling drum as a function of the current x,y position of the milling drum, the current milling depth and the target value ($Ft_{x,y}$) for the desired milling depth corresponding to the current x,y position of the milling drum.

3. The milling machine of claim 1, wherein:
the controller is further configured to control the milling depth of the milling drum separately at each end of the milling drum as a function of the target value ($Ft_{x,y}$) for the desired milling depth corresponding to the current x,y position of each end of the milling drum.

4. The milling machine of claim 1, wherein:
the controller is further configured to store the updated target profile data taking into account a milling width of the milling drum and a three-dimensional alignment of the milling drum within the stationary coordinate system independent of the milling machine.

5. The milling machine of claim 4, wherein:
the controller is further configured to assign a respective updated target value to the current x,y positions corresponding to each end of the milling drum.

6. The milling machine of claim 5, wherein:
the controller is further configured to assign interpolated updated target values to x,y positions along the milling drum between the ends of the milling drum.

7. The milling machine of claim 1, wherein:
the target profile data is configured such that the surface of the traffic area is divided into triangular or rectangular fields defined by nodes at corners of the fields.

8. The milling machine of claim 7, wherein:
the controller is further configured to update the target profile data by assigning an updated target value for the locally desired milling depth to nodes passed over by the milling drum.

9. The milling machine of claim 8, wherein:
the controller is further configured to assign interpolated updated actual profile data values to x, y positions along the milling drum between the ends of the milling drum.

10. A milling machine for milling off a traffic area, comprising:
a machine frame;

a height adjustable milling drum supported from the machine frame;

a position sensor configured to detect a current x, y position of the milling drum in a stationary coordinate system independent of the milling machine and to generate at least one position signal corresponding to the current x, y position of the milling drum in the stationary coordinate system independent of the milling machine;

a milling depth sensor configured to detect a currently adjusted milling depth (Ft') of the milling drum, and to generate at least one milling depth signal corresponding to the currently adjusted milling depth (Ft') of the milling drum; and a controller configured to:
  obtain and store actual profile data (x, y, z) of a surface of the traffic area to be worked and target profile data (x, y, z') of a surface of the traffic area in target condition;
  receive the at least one position signal and the at least one milling depth signal;
  during a milling operation, determine the current x,y position of the milling drum in the coordinate system based at least in part on the at least one position signal, and determine the current milling depth of the milling drum based at least in part on the at least one milling depth signal;
  update the z value of the actual profile data corresponding to the current x, y position of the milling drum by the current milling depth of the milling drum; and
  store the updated actual profile data.

11. The milling machine of claim 10, wherein:
the controller is further configured to control the milling depth of the milling drum as a function of the current x, y position of the milling drum, the current milling depth and a difference between a target profile z' value and an actual profile z value corresponding to the current x, y position of the milling drum.

12. The milling machine of claim 10, wherein:
the controller is further configured to control the milling depth of the milling drum separately at each end of the milling drum as a function of a difference between a target profile z' value and an actual profile z value corresponding to the current x, y position of each end of the milling drum.

13. The milling machine of claim 10, wherein:
the controller is further configured to store the updated actual profile data taking into account a milling width of the milling drum and a three-dimensional alignment of the milling drum within the stationary coordinate system independent of the milling machine.

14. The milling machine of claim 13, wherein:
the controller is further configured to assign a respective updated actual profile data z value to the current x, y positions corresponding to each end of the milling drum.

15. The milling machine of claim 10, wherein:
the target profile data is configured such that the surface of the traffic area is divided into triangular or rectangular fields defined by nodes at corners of the fields.

16. The milling machine of claim 15, wherein:
the controller is further configured to update the actual profile data by assigning an updated actual profile z value adjusted by the milling depth corresponding to nodes passed over by the milling drum.

* * * * *